United States Patent
Besperstov

(10) Patent No.: US 9,058,068 B2
(45) Date of Patent: Jun. 16, 2015

(54) PHOTODETECTOR-BASED STYLUS SYSTEM

(71) Applicant: RESEARCH IN MOTION LIMITED, Waterloo (CA)

(72) Inventor: Iouri Petrovitch Besperstov, Innisfil (CA)

(73) Assignee: BlackBerry Limited, Waterloo, Ontario (CA)

( * ) Notice: Subject to any disclaimer, the term of this patent is extended or adjusted under 35 U.S.C. 154(b) by 120 days.

(21) Appl. No.: 13/852,214

(22) Filed: Mar. 28, 2013

(65) Prior Publication Data

US 2014/0292729 A1    Oct. 2, 2014

(51) Int. Cl.
*G06F 3/033* (2013.01)
*G06F 3/0354* (2013.01)
*G06F 3/03* (2006.01)
*G06F 3/038* (2013.01)

(52) U.S. Cl.
CPC .......... *G06F 3/03545* (2013.01); *G06F 3/0317* (2013.01); *G06F 3/0386* (2013.01); *G06F 3/03542* (2013.01)

(58) Field of Classification Search
CPC .............. G06F 3/03542; G06F 3/0317; G06F 3/03545; G06F 3/0386
USPC ............ 345/179, 183; 178/19.05; 250/227.13
See application file for complete search history.

(56) References Cited

U.S. PATENT DOCUMENTS

| | | | |
|---|---|---|---|
| 3,758,782 A | 9/1973 | Radford et al. | |
| 3,937,558 A | 2/1976 | Mukai et al. | |
| 4,454,417 A | 6/1984 | May | |
| 4,575,627 A | 3/1986 | Pease et al. | |
| 4,695,831 A | 9/1987 | Shinn | |
| 5,179,368 A * | 1/1993 | Lippincott | 345/156 |
| 5,502,514 A * | 3/1996 | Vogeley et al. | 348/771 |
| 5,633,691 A * | 5/1997 | Vogeley et al. | 348/771 |
| 6,377,249 B1 * | 4/2002 | Mumford | 345/179 |
| 6,914,595 B1 | 7/2005 | Kobayashi et al. | |
| 7,259,754 B2 * | 8/2007 | Sasaki et al. | 345/179 |
| 7,421,111 B2 * | 9/2008 | Dietz et al. | 382/154 |
| 8,217,997 B2 * | 7/2012 | Solomon et al. | 348/63 |
| 8,519,983 B2 * | 8/2013 | Sprague et al. | 345/179 |
| 2003/0095109 A1 * | 5/2003 | Sasaki et al. | 345/173 |
| 2005/0099405 A1 * | 5/2005 | Dietz et al. | 345/179 |
| 2006/0250381 A1 | 11/2006 | Geaghan | |
| 2008/0094376 A1 | 4/2008 | Dietz | |
| 2009/0167726 A1 | 7/2009 | Sprague et al. | |
| 2011/0227827 A1 * | 9/2011 | Solomon et al. | 345/158 |
| 2013/0113762 A1 * | 5/2013 | Geaghan | 345/179 |

OTHER PUBLICATIONS

European Search Report, EP13161669.0, Aug. 1, 2013.

* cited by examiner

*Primary Examiner* — Lun-Yi Lao
*Assistant Examiner* — Peter D McLoone
(74) *Attorney, Agent, or Firm* — Fleit Gibbons Gutman Bongini & Bianco P.L.

(57) ABSTRACT

An electronic device is configured to determine a location of a stylus with respect to a display screen dependent upon first and second timing signals. A change in state of a reference pixel cell is detected using a photodetector located in close proximity to the reference pixel cell and a change in state of a pixel cell in proximity to the stylus, in response to a stylus photodetector signal received from a photodetector of the stylus. The location of the stylus with respect to the display screen is determined from the time difference between the change in state of the reference pixel cell and the change in state of the pixel cell in proximity to the stylus.

21 Claims, 4 Drawing Sheets

PHOTODETECTOR-BASED STYLUS SYSTEM

BACKGROUND

Light pens enable a position on a phosphorescent display of a Cathode Ray Tube (CRT) display to be identified. In a CRT display, an electron beam is moved across a screen in a raster scan, with the beam incident on a phosphorescent screen. Since the raster scan is performed at a known rate, the time between the start of the scan and the time at which a given position is excited by the beam is also known. Therefore, the time between the start of the scan and the time at which a light pen located at a position on the screen detects light may be used to determine the location of the light pen on the screen.

Light pens cannot be used with LCD displays due to variable latency in the digital interface between the computer and the display.

Alternatives to light pens, which may be employed with LCD screens, include system electromagnetic signal detection. For example, a grid of electromagnetic sensors embedded in the screen may be used to detect an electromagnetic field (such as an RF field) generated by a stylus, or may be used to sense variations in the magnetic field caused by the stylus. Alternatively, the electromagnetic field generated by pixel addressing may be detected by the stylus. Stylus systems are often required to provide position information not only in the X-Y plane of the screen, but also in the direction away from the screen (i.e. in 'hover' mode). Electromagnetic styluses typically perform poorly when the stylus is used in a 'hover' mode.

Alternatively, ultrasonic signals generated by a stylus may be detected by sensors around the periphery of the screen. Such schemes rely upon sophisticated software algorithms and require significant dedicated hardware, such as multiple sensors and data converters.

It would be useful to provide a simple, accurate and efficient optical stylus system for use with LCD screens.

BRIEF DESCRIPTION OF THE DRAWINGS

Exemplary embodiments of the present disclosure will be described below with reference to the included drawings such that like reference numerals refer to like elements and in which.

DETAILED DESCRIPTION

Figure 1:
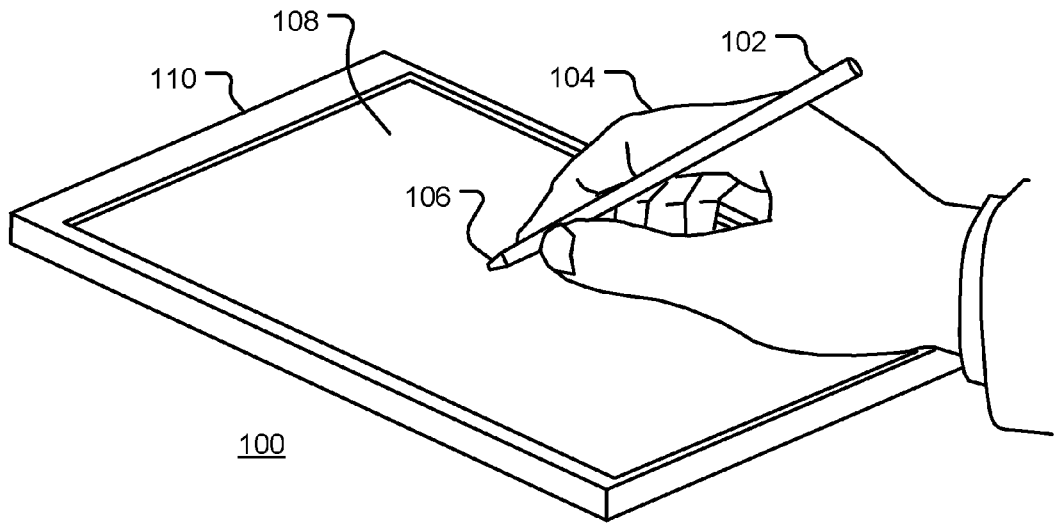
FIG. 1 is a diagram of a stylus system, in accordance with exemplary embodiments of the present disclosure.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described herein.

Due to considerations of size, weight and electrical inefficiency, CRT displays has been largely discontinued in favour of liquid crystal displays (LCDs). There are many differences between LCDs and CRTs that prevent the use of a conventional light pen with LCDs. An LCD display has an array of individually addressable pixels and a driver that can address each individual pixel. The driver receives and processes a digital signal from a computer or other electronic device via a digital interface. Latency in the digital interface means that even if the pixels are driven in a raster scan, the start time of the scan and the speed on the scan may not be known to the computer. Further, in some LCDs, the pixels remain illuminated from one frame to the next, so the intensity of the light may not change. In such cases the illumination level of a pixel cannot be used to detect timing information.

The display screen of the electronic device includes an array of pixel cells. When the display screen is refreshed, the state of each individual pixel cell is refreshed in sequence. In one illustrative embodiment, the pixel cells of the array of pixel cells of the display screen are refreshed in a scan pattern, beginning with the reference pixel cell. The present disclosure recognizes that a variation occurs in the light intensity of each pixel as it is refreshed. This variation may be monitored by a photodetector in a stylus and used to determine the location of the stylus.

In accordance with an aspect of the present disclosure, an electronic device is configured to determine a location of a stylus with respect to a display screen dependent upon first and second timing signals. A change in state of the reference pixel cell is detected using a photodetector located in close proximity to the reference pixel cell and a change in state of a pixel cell in proximity to a stylus, in response to a stylus photodetector signal received from a photodetector of the stylus. The location of the stylus with respect to the display screen is determined from the time difference between the change in state of the reference pixel cell and the change in state of the pixel cell in proximity to the stylus.

In one exemplary embodiment, display data is transmitted to a display screen via a digital interface. A timer is started at a first time in response to a first timing signal from a reference photodetector located in close proximity to a reference pixel cell of the display screen. The timer is stopped at a second time in response to a second timing signal from a photodetector of the stylus. The location of the stylus is determined with respect to the display screen dependent upon a difference between the second and first times.

In operation, the display screen receives display data from a processor of the electronic device via a digital interface. In accordance with one aspect of the present disclosure, a reference photodetector produces a first timing signal in response to a change in state of a reference pixel cell of the array of pixel cells. The processor is responsive to the first timing signal and to a second timing signal from a photodetector of a stylus and is configured to determine a location of the stylus with respect to the display screen dependent upon the first and second timing signals. The electronic device may include a wireless interface configured to receive the second timing signal. In one exemplary embodiment, the time difference between the first and second timing signals is used to determine the stylus position. This is in contrast to prior stylus location systems, where only a signal from a light pen in used, since there is no significant delay in the interface between a processor and an analog display screen such as a CRT.

In one illustrative embodiment, the change in state of the reference pixel cell is a change in the illumination of the reference pixel cell. For example, the illumination level may gradually reduce between refresh times, resulting in an increase in illumination level when a pixel is refreshed. In a further embodiment the change in state of the reference pixel cell comprises de-activation or level reduction of the reference pixel cell. In this approach, the illumination level of a pixel is deliberately reduced just before the pixel is refreshed.

The electronic device may include a timer. In operation, the processor starts the timer in response to the first timing signal and stops the timer in response to the second timing signal.

The electronic device may include a second reference photodetector that produces a third timing signal in response to a change in state of a second reference pixel cell of the array of pixel cells. The time between the first and third timing signals may be used to determine the refresh rate of the display screen. The processor operates to determine the location of the stylus with respect to the display screen dependent upon the first, second and third timing signals.

FIG. 1 is a diagram of a stylus system, in accordance with exemplary embodiments of the present disclosure. The stylus system 100 includes a stylus 102 that is operated by a user 104. In operation, the tip 106 of the stylus 102 is moved across, or in proximity to, a display screen 108 of an electronic device 110. The location of the stylus 102, or more particularly the tip 106 of the stylus, with respect to the screen is detected. The detected location may be used to control software applications executed on the electronic device 110. In a hover mode, the stylus is moved in proximity to the display screen. For example, when the tip of the stylus is less a specified distance (such 10 mm or 5 mm) from the surface of the display screen, its position and/or motion may be tracked. The specified distance may be fixed or adjustable by the user.

Figure 2:
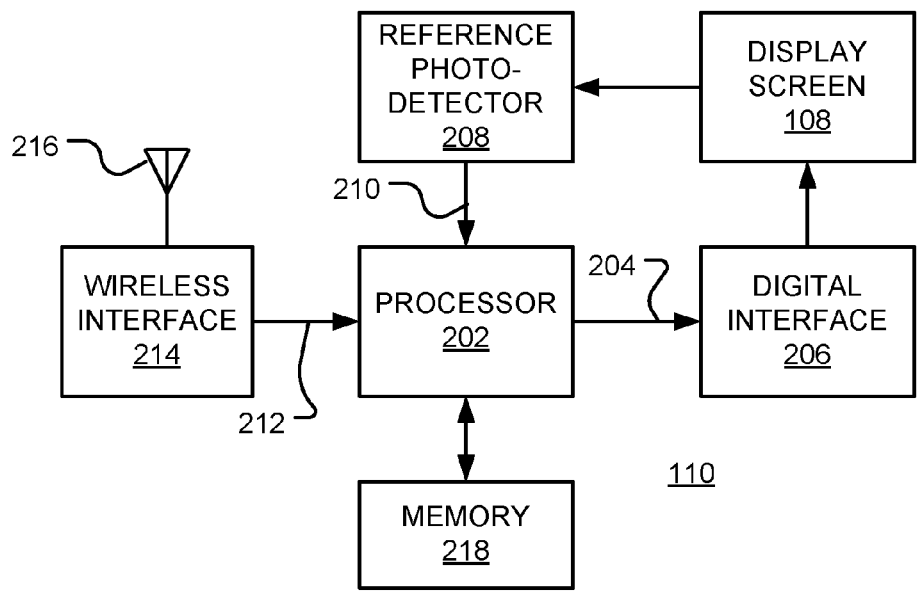
FIG. 2 is a block diagram of an electronic device, in accordance with exemplary embodiments of the present disclosure.

FIG. 2 is a block diagram of an electronic device 110, in accordance with exemplary embodiments of the present disclosure. The electronic device 110 includes a processor 202 that provides a display signal 204 to a display screen 108 via a digital interface 206. The display screen comprises an array of pixel cells, the illumination of which is controlled by the display signal 204 to render an image on the display screen 108. A characteristic of the digital interface 206 is that it introduces a time delay, or latency, between when a display signal 204 is supplied and when the corresponding image is rendered on the display screen 108. An example of a digital interface is a Mobile Industry Processor Interface (MIPI) digital interface. As a result, the processor 202 does not know when a particular pixel on the display screen 108 is active.

In accordance with an embodiment of the disclosure, a reference photodetector 208 is located adjacent to a pixel cell of a display screen 108 of the electronic device 110. This pixel cell is referred to as the reference pixel cell. The photodetector 208 may be a photodiode, for example. The reference photodetector provides a first timing signal 210 to a processor 202. The first timing signal is indicative of the illumination level of the reference pixel cell. The use of the reference photodetector 208, allows the processor 202 to determine when the display screen 108 is being refreshed. Optionally, the reference photodetector may also provide a measurement of the intensity of light at the reference pixel cell. In one exemplary embodiment, the reference photodetector 208 is located adjacent the first pixel cell to be refreshed in each frame. This may be the top left pixel of the display screen 208, for example. In this way, it is not necessary for the processor 202 to know the processing delay introduced by digital interface 206 between the processor 202 and the display screen 108.

A second photodetector is located in the tip of the stylus and provides a second timing signal 212 to the processor 202. The second timing signal 212 is generated in response to the illumination level of one or more pixel cells in the vicinity of the tip of the stylus. The second timing signal 212 may be received via a wireless interface 214 with antenna 216, or via a wired interface.

The processor 202 is configured to determine the location of the tip of the stylus dependent upon the first timing signal 210 and the second timing signal 212.

In turn, the location of the tip of the stylus may be used to control one or more software applications executed on the processor 202. The computer instructions defining the applications may be stored in a memory 218 coupled to the processor 202. The memory 218 may also be used for data storage.

Figure 3:
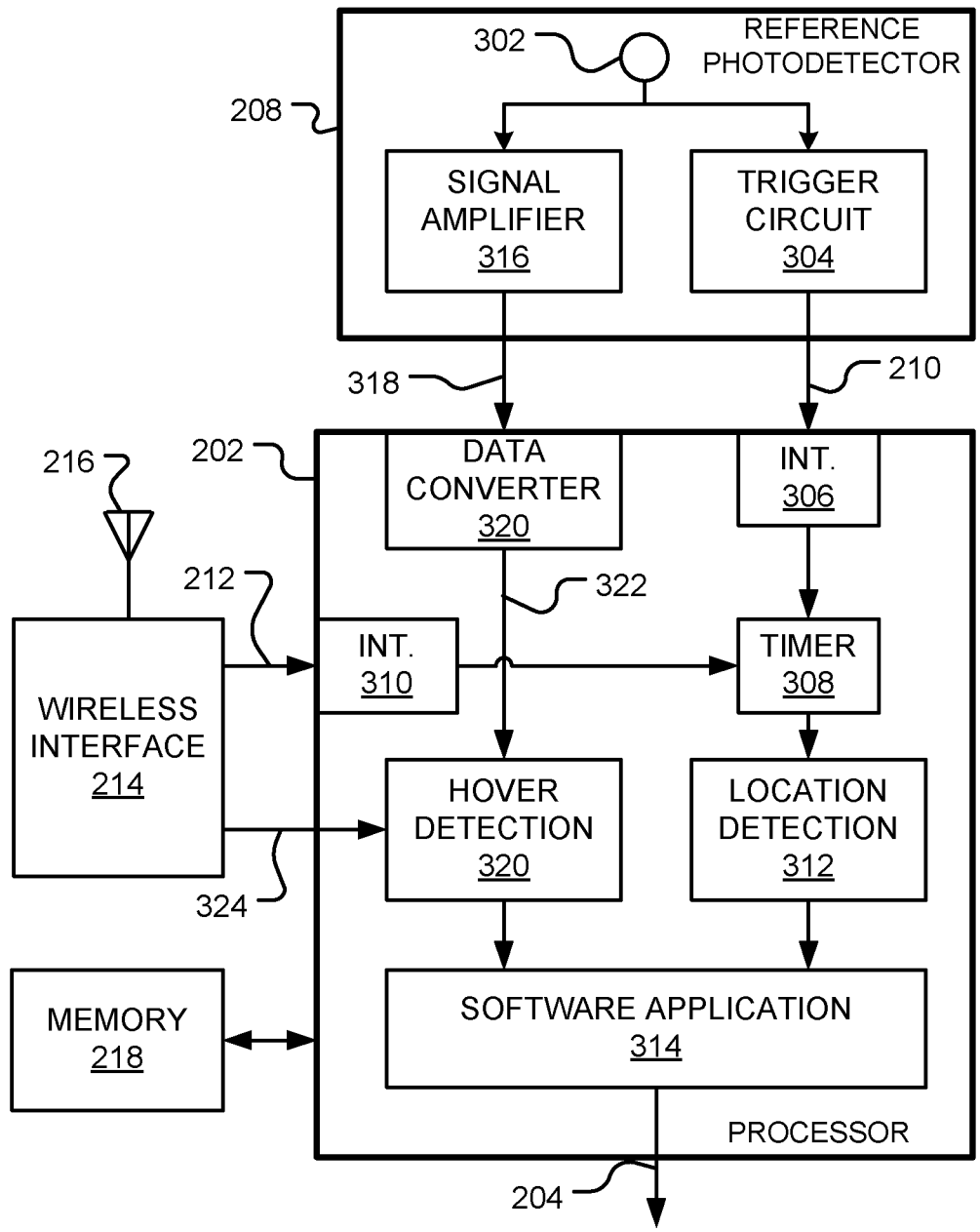
FIG. 3 is a block diagram of a processor and photodetector of an electronic device, in accordance with exemplary embodiments of the present disclosure.

FIG. 3 is a block diagram of a processor 202 and reference photodetector 208 of an electronic device, in accordance with exemplary embodiments of the present disclosure. In this embodiment, the reference photodetector 208 includes a sensing element 302, such as a photodiode or other element that responds to light from the reference pixel cell of the display screen. The output from the sensing element 302 is passed to a trigger circuit 304, such as a comparator, to generate a first timing signal 210. The first timing signal 210 is passed to a first interrupt circuit 306 of the processor 202. The resulting first interrupt signal is used to start a timer 308. The timer 308 may be stopped in response to a second interrupt signal received from a second interrupt circuit 310. The second interrupt circuit 310 is, in turn, responsive to the second timing signal 212. In the embodiment shown, the second timing signal is generated in response to a radio signal from a stylus that is received by antenna 216 of wireless interface 214. The time between the first and second interrupts is passed to a location detection module 312 of the processor 202, where it is used to determine the location of the stylus. For example, if the frame rate is $T_{frame}$ and the array has N rows and M columns of pixel cells, the time to refresh each individual pixel is $$T_{pixel} = \frac{T_{frame}}{N \times M} \quad (1)$$

If the array is refreshed in a raster scan, one row at time, and the reference pixel cell is located at row and column position $(n_0, m_0)$, the measured time between refreshing the reference pixel and refreshing the pixel at the stylus location may be written as $$T = [(n-n_0)N + (m-m_0)]T_{pixel}. \quad (2)$$

If the reference pixel is refreshed at time $T_1$ and the pixel at the stylus location is refreshed at time $T_2$, the time T is given by $$T = T_2 - T_1. \quad (3)$$

The row and column position (n,m) of the stylus may be determined from expressions (2) and (3) using simple arithmetic. In one illustrative embodiment, the reference pixel is located at the top left corner of the display screen, at position (0,0).

In one exemplary embodiment, the processor and the display screen operate from a common clock. This arrangement provides an accurate measure of the elapsed time T to be made, in turn enabling the processor to determine the location of the stylus on the screen with high accuracy.

The location detection module 312 determines the location of the stylus on the display screen. The determined location may be provided as an input to control a software application 314 executed on the processor.

As the tip of the stylus is moved away from the surface of the display screen, the intensity of the light received by the photodetector in the stylus is reduced. A comparison between the light intensity level sensed by the stylus photodetector and the level sensed by the reference photodetector enables the processor to estimate the distance of the stylus from the screen. This distance, known as the hover distance, may be used as by processor to control aspects of software applications executed on the processor. In the embodiment shown in FIG. 3, the output from the reference photodetector element 302 is passed to a signal amplifier 316. The resulting amplified signal 318 is passed to an analog-to-digital data converter 320 that may be located in the processor (as shown) or in the photodetector 208. This generates a first intensity signal 322. A second intensity signal 324 is received from the stylus via the wireless interface 214. The signal may be, for example, a digital signal or a frequency modulated analog signal. The first and second intensity signals (322 and 324) are used in hover detection module 320 to estimate the distance of the stylus photodetector from the display screen. As the stylus moves away from the display screen, the intensity measured by the stylus photodetector is decreased. The intensity at the stylus photodetector relative to the intensity at the reference photodetector varies in dependence upon the stylus hover height. This dependency may be determined by calculation or by calibration measurements, allowing the hover height to be determined from the first and second intensity signals.

The second intensity signal and the second timing signal may comprise a common signal that contains both intensity and timing information. For example, a timing information may be derived from an intensity signal by comparing the intensity signal to a threshold level. Alternatively, transmission of a digital intensity signal may begin at a specific time or contain a timing code. Similarly, the first intensity signal 322 and the first timing signal 210 are derived from a common signal.

Figure 4:
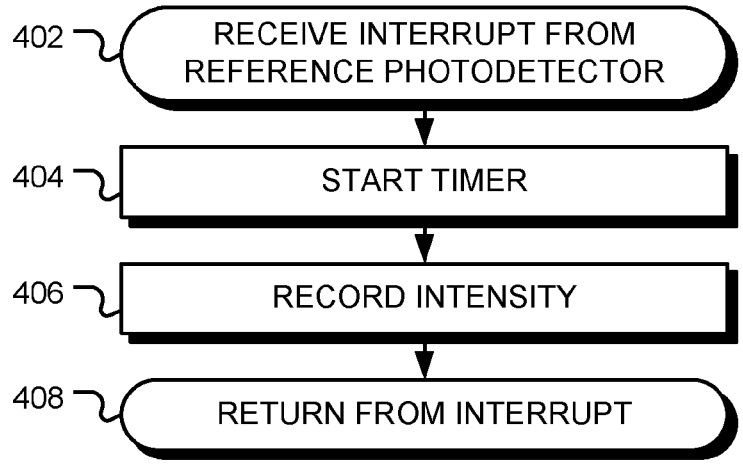
FIGS. 4 and 5 are flow charts of a method for determining a stylus location, in accordance with exemplary embodiments of the present disclosure.

FIG. 4 is a block diagram of a method 400 for determining a stylus location in accordance with exemplary embodiments of the present disclosure. The method begins at block 402 when an interrupt is received from the reference photodetector, indicating that the reference pixel cell is being refreshed. The interrupt is generated in response to a change in light intensity at the reference pixel cell. The interrupt is serviced by the processor and a timer is started at block 404. In one illustrative embodiment, the timer clock and the display screen use a common clock to facilitate accurate timing. Optionally, at block 406, the intensity of the light detected at the reference pixel is recorded for later use. At block 408 the processor returns from the interrupt to allow normal operation to resume.

Figure 5:
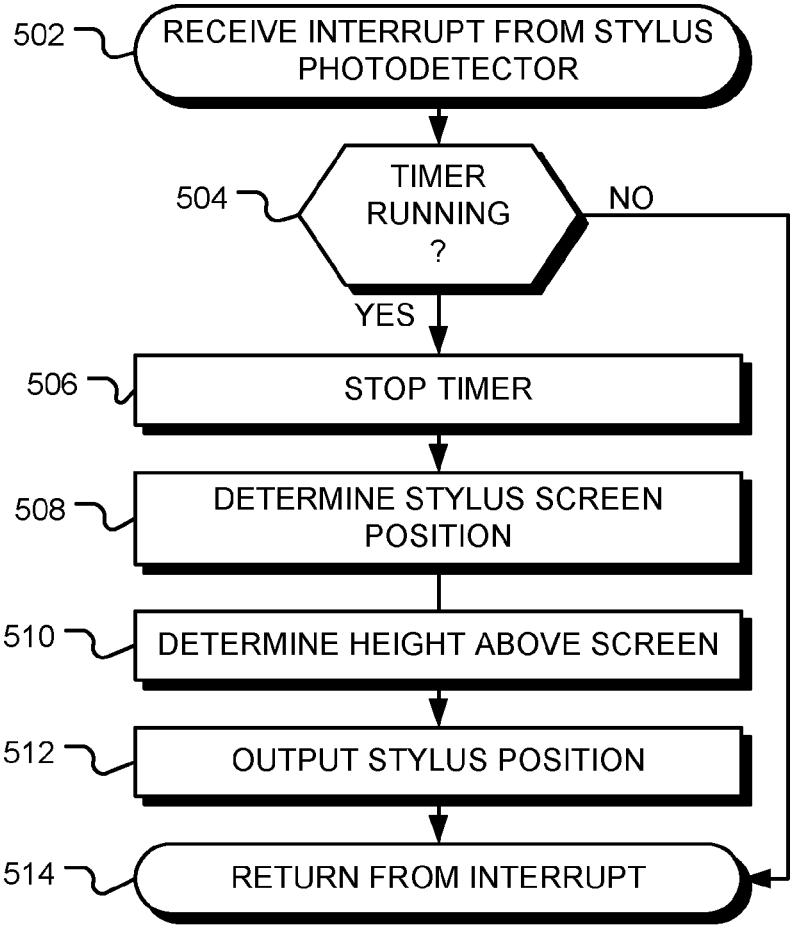

FIG. 5 is a block diagram of a method 500 for determining a stylus location in accordance with exemplary embodiments of the present disclosure. The method begins at block 502 when an interrupt is received from a stylus, indicating that a pixel cell in close proximity to the stylus is being refreshed. The interrupt is generated in response to a change in light intensity at the pixel cell. At decision block 504 it is determined if a timer is running. If the timer is running, as depicted by the positive branch from decision block 504, the timer is stopped at block 506. The timer value is used at block 508 to determine the stylus location. Optionally, at block 510, the intensity signal from the stylus is compared to the stored reference intensity value to determine the height of the stylus above the screen at block 510. At block 512, the stylus position, which may include both the two-dimensional position on the display screen and the height above the display screen, is output. The output position may be used to control a software application executed on the processor. The processor returns from the interrupt at block 514. If the timer is not running, as depicted by the negative branch from decision block 504, no action is taken and the processor returns from the interrupt at block 514.

Figure 6:
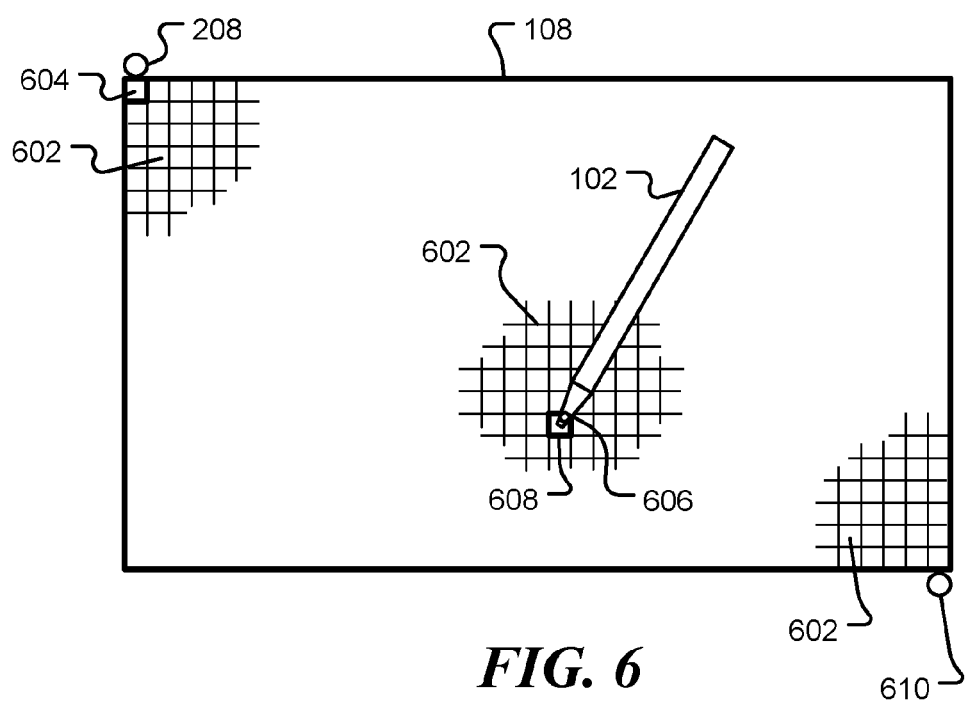
FIG. 6 is a diagram of a stylus system, in accordance with exemplary embodiments of the present disclosure.

FIG. 6 is a diagram of a stylus system, in accordance with exemplary embodiments of the present disclosure. Referring to FIG. 6, a display screen 108 of an electronic device comprises an array pixel cells 602. A reference photodetector 208 is located next to a reference pixel cell 604. In this embodiment, the reference pixel cell is the top left cell, but another pixel cell could be used. The reference photodetector 208 provides a first timing signal related to a change in illumination level that occurs during the refreshing of the reference pixel cell. A stylus photodetector 606 is located in the tip of stylus 102 and is configured to detect light from the display screen. In particular, the stylus photodetector 606 receives light from the closest pixel cell 608. The stylus photodetector 606 provides a second timing signal related to a change in illumination level that occurs during the refreshing of the pixel cell 608.

A second reference photodetector 610 may be used to measure the total refresh time of the display screen. This allows the refresh time to be determined when the refresh time is different to the frame period.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described embodiments may be combined to create alternative embodiments not explicitly shown and described herein.

The present disclosure may be embodied in other specific forms without departing from its spirit or essential characteristics. The described exemplary embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An electronic device comprising:
   a display screen having an array of pixel cells;
   a reference photodetector configured to produce a first timing signal in response to a change in state of a reference pixel cell of the array of pixel cells; and
   one or more processors in communication with the display screen and the reference photodetector and configured to transmit display data to the display screen via a digital interface, the one or more processors responsive to the first timing signal and to a second timing signal from a photodetector of a stylus,
   the one or more processors further configured to utilize the first and second timing signals to determine a location of the stylus with respect to the display screen,
   wherein the one or more processors are coupled the display screen via a digital interface having a latency between when the display data is supplied by the one or more processors and when the corresponding image is rendered on the display screen, and
   wherein the reference photodetector is fixedly coupled to the electronic device in proximity to the reference pixel cell.

2. The electronic device of claim 1, where the change in state of the reference pixel cell comprises an increase in illumination level of the reference pixel cell.

3. The electronic device of claim 1, where the change in state of the reference pixel cell comprises a decrease in illumination level of the reference pixel cell.

4. The electronic device of claim 1, further comprising a timer in communication with the one or more processors, the one or more processors configured to start the timer in response to the first timing signal and stop the timer in response to the second timing signal.

5. The electronic device of claim 1, further comprising a wireless interface configured to receive the second timing signal.

6. The electronic device of claim 1, further comprising a second reference photodetector, configured to produce a third timing signal in response to a change in state of a second reference pixel cell of the array of pixel cells, where the one or more processors are configured to determine the location of the stylus with respect to the display screen dependent upon the first, second and third timing signals.

7. The electronic device of claim 1, where the array of pixel cells of the display screen is refreshed in a scan pattern, beginning with the reference pixel cell.

8. The electronic device of claim 1, where the first timing signal is characteristic of a light intensity of the reference pixel cell and the second timing signal is characteristic of a light intensity at the photodetector of the stylus, and where the one or more processors are configured to determine a distance of the stylus from the display screen dependent upon the light intensity of the reference pixel cell and the light intensity at the photodetector of the stylus.

9. The electronic device of claim 1, further comprising the stylus, the stylus comprising:
   a photodetector located at a tip of the stylus and configured to produce the second timing signal in response to a change in state of a pixel cell of the array of pixel cells; and
   a wireless interface configured to transmit the second timing signal to the processor.

10. The electronic device of claim 1, where the reference photodetector comprises a photodiode.

11. The electronic device of claim 1, where the display screen comprises a liquid crystal display.

12. A method for determining a location of a stylus with respect to a display screen of an electronic device, the method comprising:
    transmitting display data from a processor of the electronic device to the display screen via a digital interface, where the digital interface has a latency between when the display data is supplied by the processor and when the corresponding image is rendered on the display screen;
    detecting a change in state of a reference pixel cell of an array of pixel cells of the display screen using a reference photodetector located in close proximity to the reference pixel cell;
    detecting a change in state of a pixel cell of the array of pixel cells in proximity to a stylus, in response to a stylus photodetector signal received from a photodetector of the stylus;
    determining a time difference between the change in state of the reference pixel cell and the change in state of the pixel cell in proximity to the stylus; and
    determining the location of the stylus with respect to the display screen dependent upon the time difference;
    wherein the reference photodetector is fixedly coupled to the electronic device in proximity to the reference pixel cell.

13. The method of claim 12, further comprising receiving the stylus photodetector signal via a wireless interface.

14. The method of claim 12, where detecting the change in state of the reference pixel cell comprises receiving an interrupt signal from the photodetector located in close proximity to the reference pixel cell.

15. The method of claim 14, where determining a time difference between the change in state of the reference pixel cell and the change in state of the pixel cell in proximity to the stylus comprises:
    starting a timer in response to the interrupt signal from the photodetector located in close proximity to the reference pixel cell; and
    stopping the timer in response to the stylus photodetector signal.

16. The method of claim 12, further comprising:
    sensing a light intensity of the reference pixel cell;
    sensing a light intensity at the photodetector of the stylus, and
    determining a distance of the stylus from the display screen dependent upon the light intensity of the reference pixel cell and the light intensity at the photodetector of the stylus.

17. The method of claim 12, further comprising:
    varying an illumination level of each pixel cell of the array of pixel cells during a refresh cycle.

18. A non-transitory computer-readable medium having computer-executable instructions for determining a location of a stylus with respect to a display screen of an electronic device that, when executed by a processor, cause the processor to:
    transmit display data to a display screen via a digital interface, the display data representative of an image to be rendered on the display screen, where the digital interface has a latency between when the display data is supplied by the processor and when the corresponding image is rendered on the display screen;

start a timer at a first time in response to a first timing signal from a reference photodetector located in close proximity to a reference pixel cell of the display screen;

stop the timer at a second time in response to a second timing signal from a photodetector of a stylus; and determine a location of the stylus with respect to the display screen dependent upon a difference between the second and first times, wherein the reference pixel cell is response to the display data to render a pixel of the image; and wherein the reference photodetector is fixedly coupled to the electronic device in proximity to the reference pixel cell.

19. The non-transitory computer-readable medium of claim 18 having further computer-executable instructions that, when executed by a processor, cause the processor to determine a distance of the stylus from the display screen dependent upon a light intensity at the reference photodetector and dependent upon a light intensity at the photodetector of the stylus.

20. The non-transitory computer-readable medium of claim 18 having further computer-executable instructions that, when executed by a processor, cause the processor to receive the second timing signal from the stylus via a wireless interface.

21. The non-transitory computer-readable medium of claim 18 having further computer-executable instructions that, when executed by a processor, cause the processor to control a software application executed on the processor dependent upon the location of the stylus with respect to the display screen.

* * * * *